Oct. 4, 1927. 1,644,192
E. R. KAST
MACHINE FOR ASSEMBLING AND STITCHING SIGNATURES
Filed Nov. 8, 1922 13 Sheets-Sheet 1

INVENTOR
Edward R. Kast.
BY Mauro, Cameron,
Lewis & Herkam
ATTORNEYS

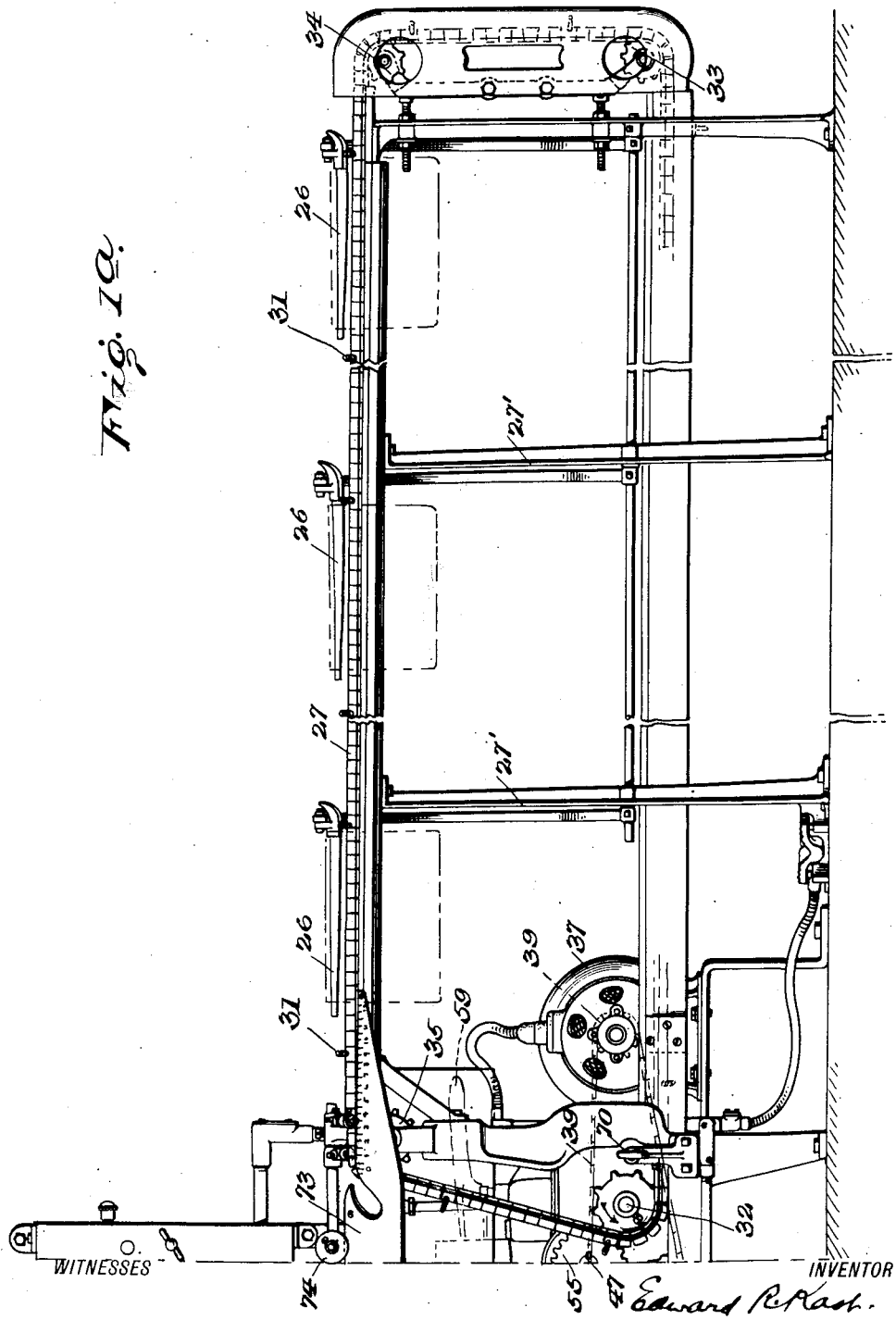

Oct. 4, 1927. 1,644,192
E. R. KAST
MACHINE FOR ASSEMBLING AND STITCHING SIGNATURES
Filed Nov. 8, 1922 13 Sheets-Sheet 3
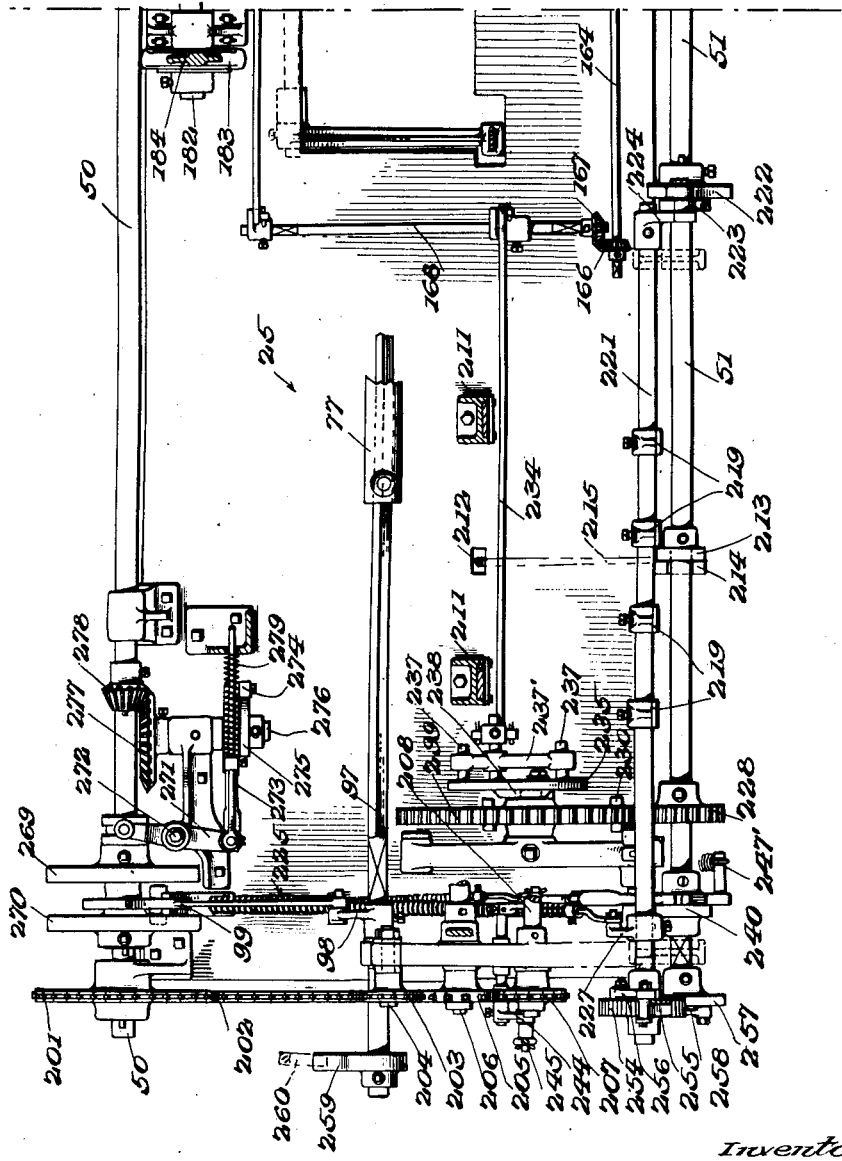

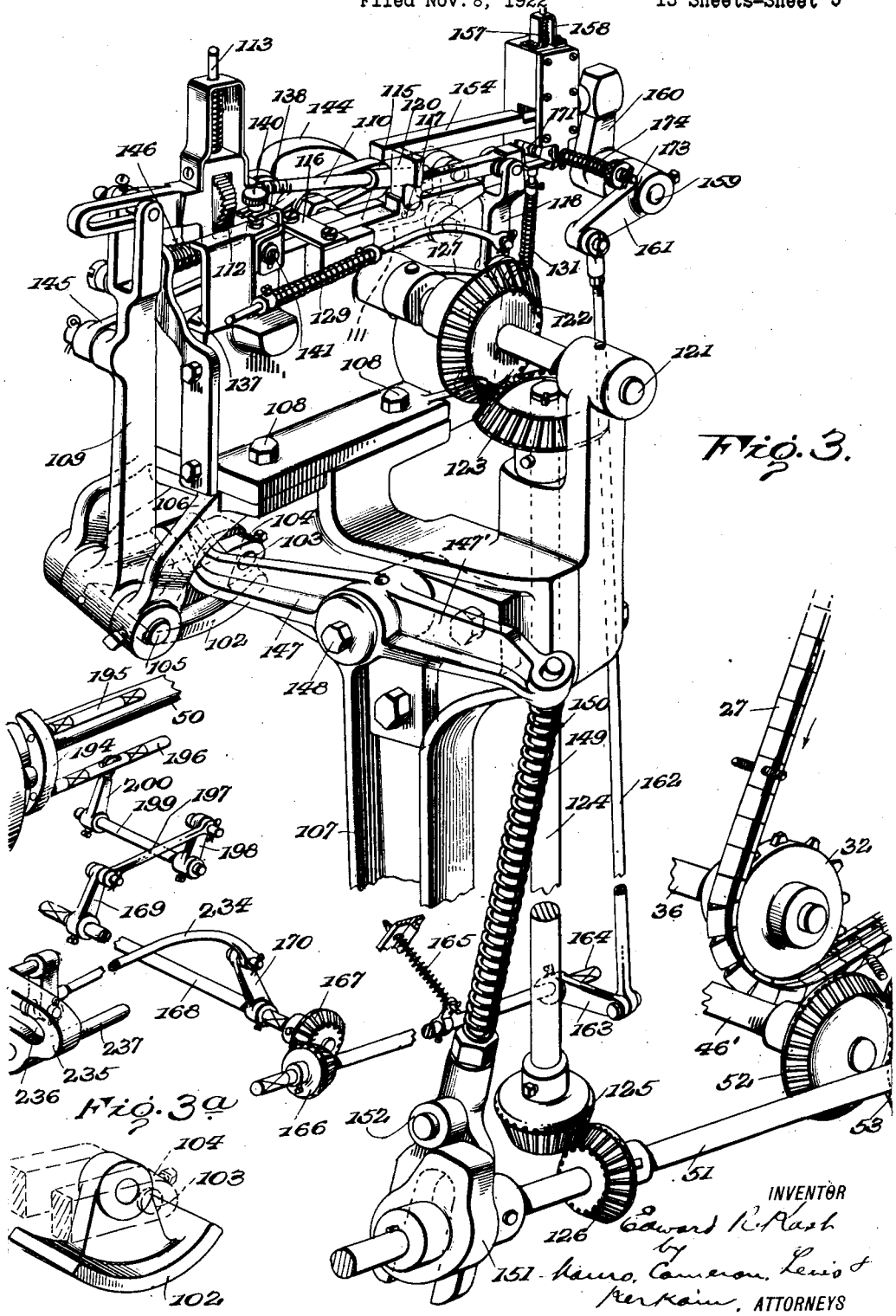

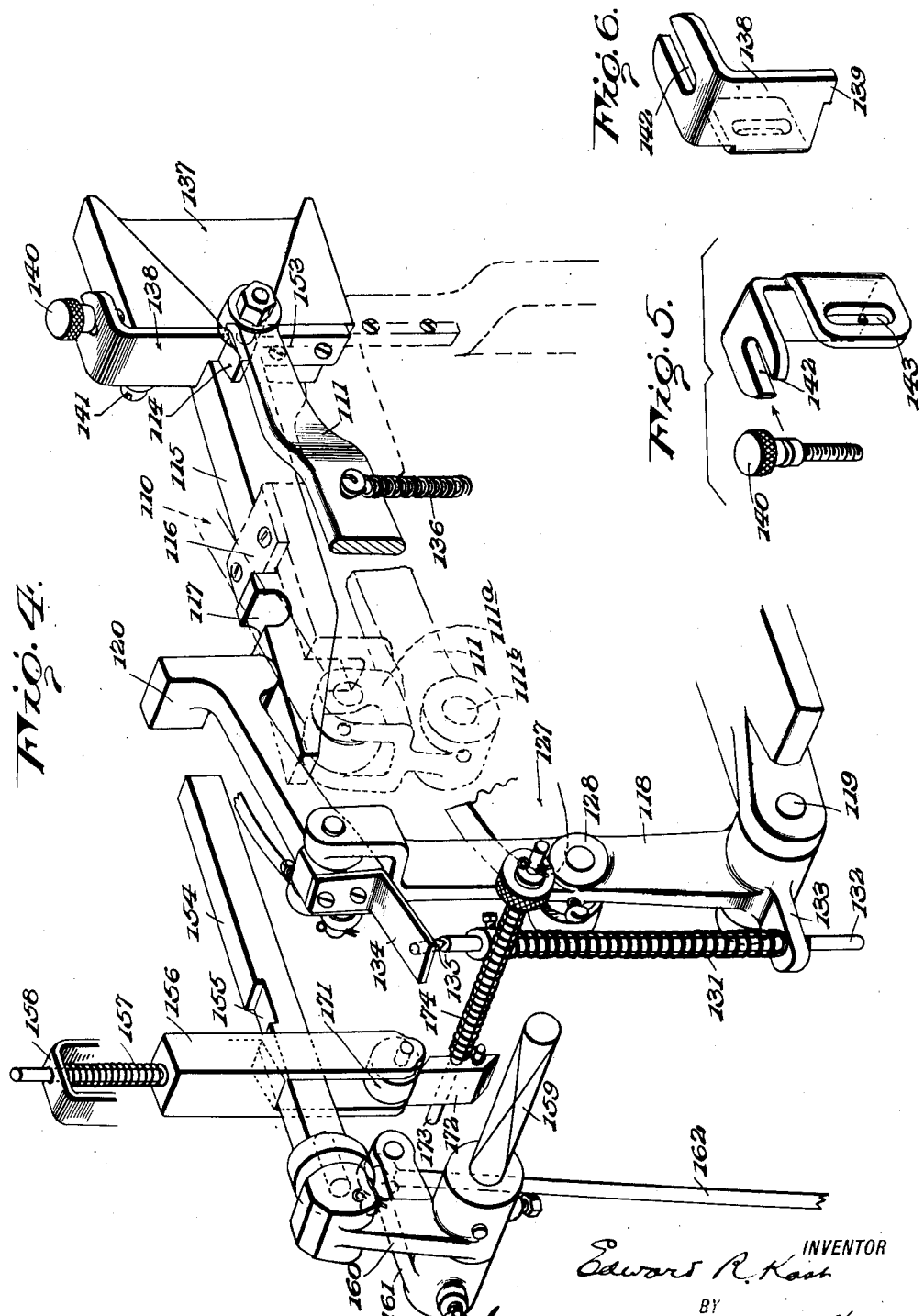

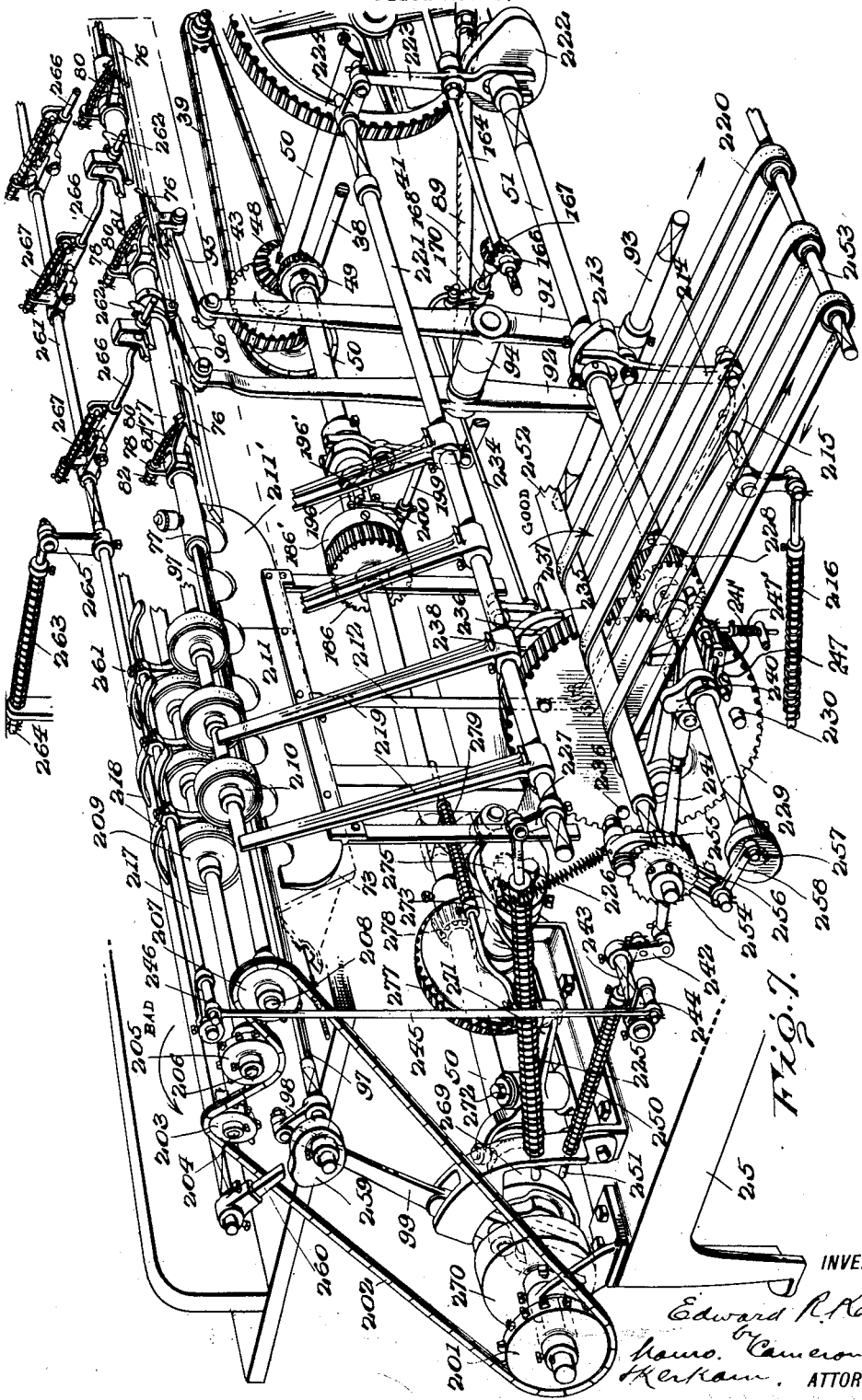

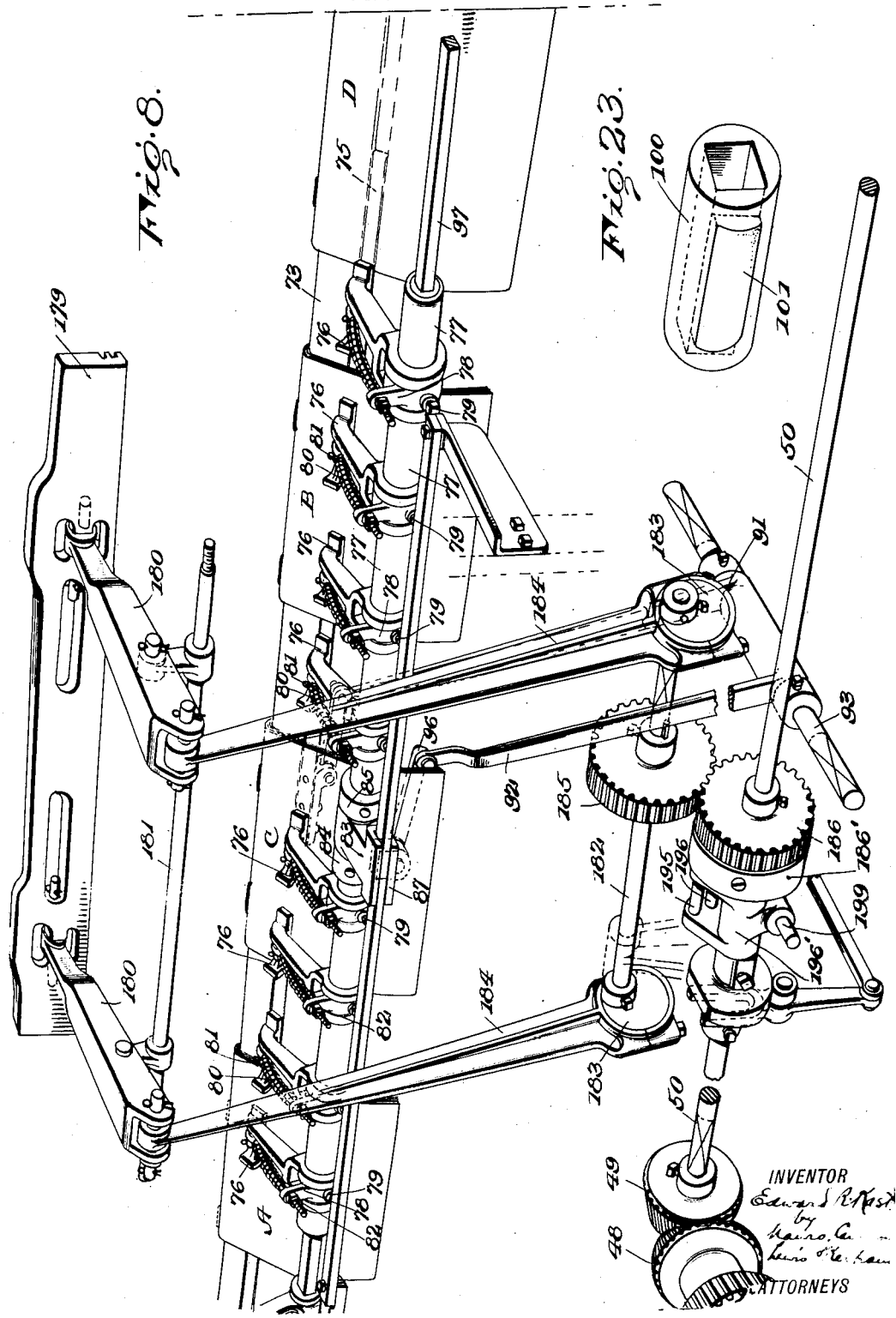

Oct. 4, 1927. 1,644,192
E. R. KAST
MACHINE FOR ASSEMBLING AND STITCHING SIGNATURES
Filed Nov. 8, 1922 13 Sheets-Sheet 9
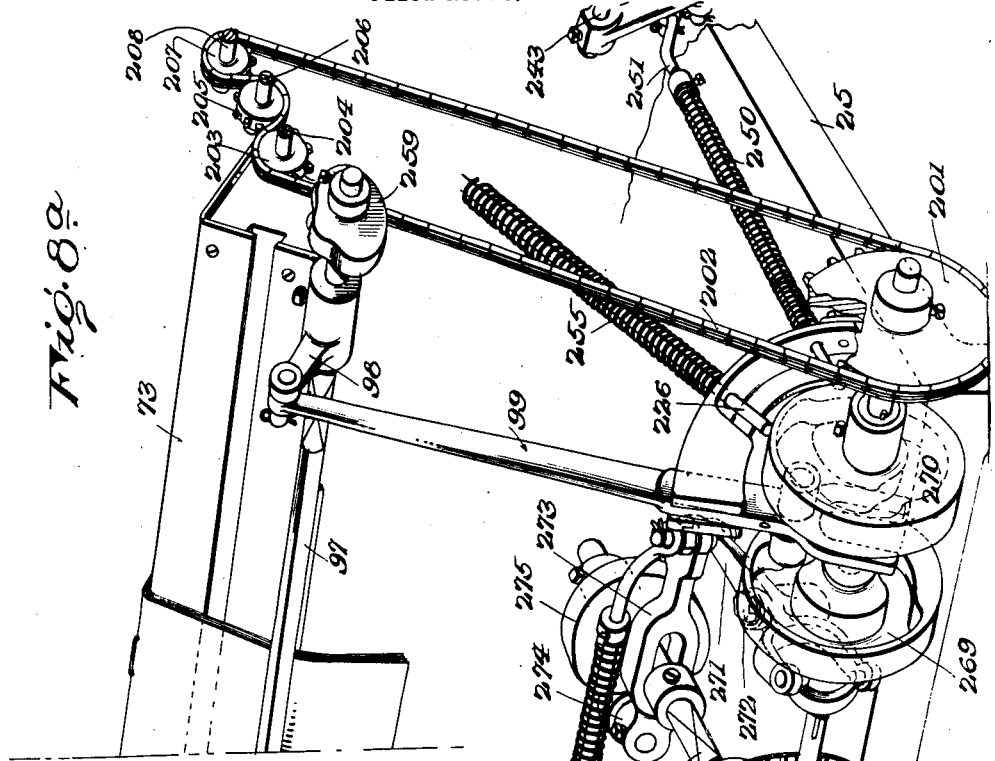
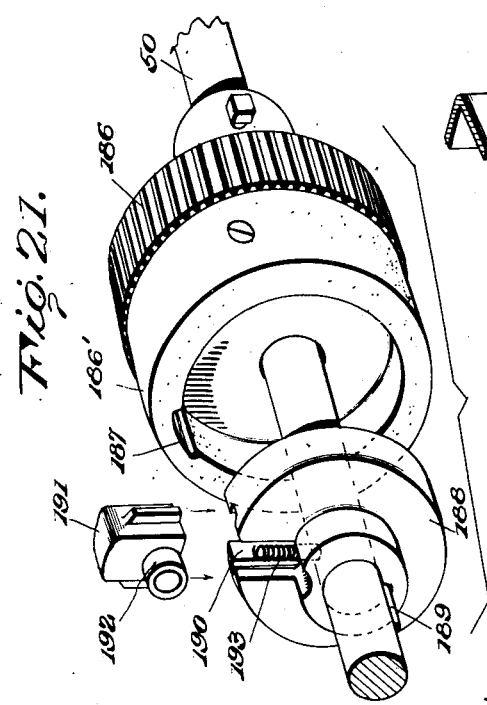
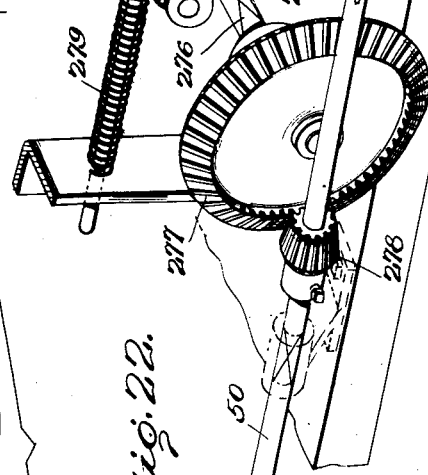
INVENTOR
BY
ATTORNEYS

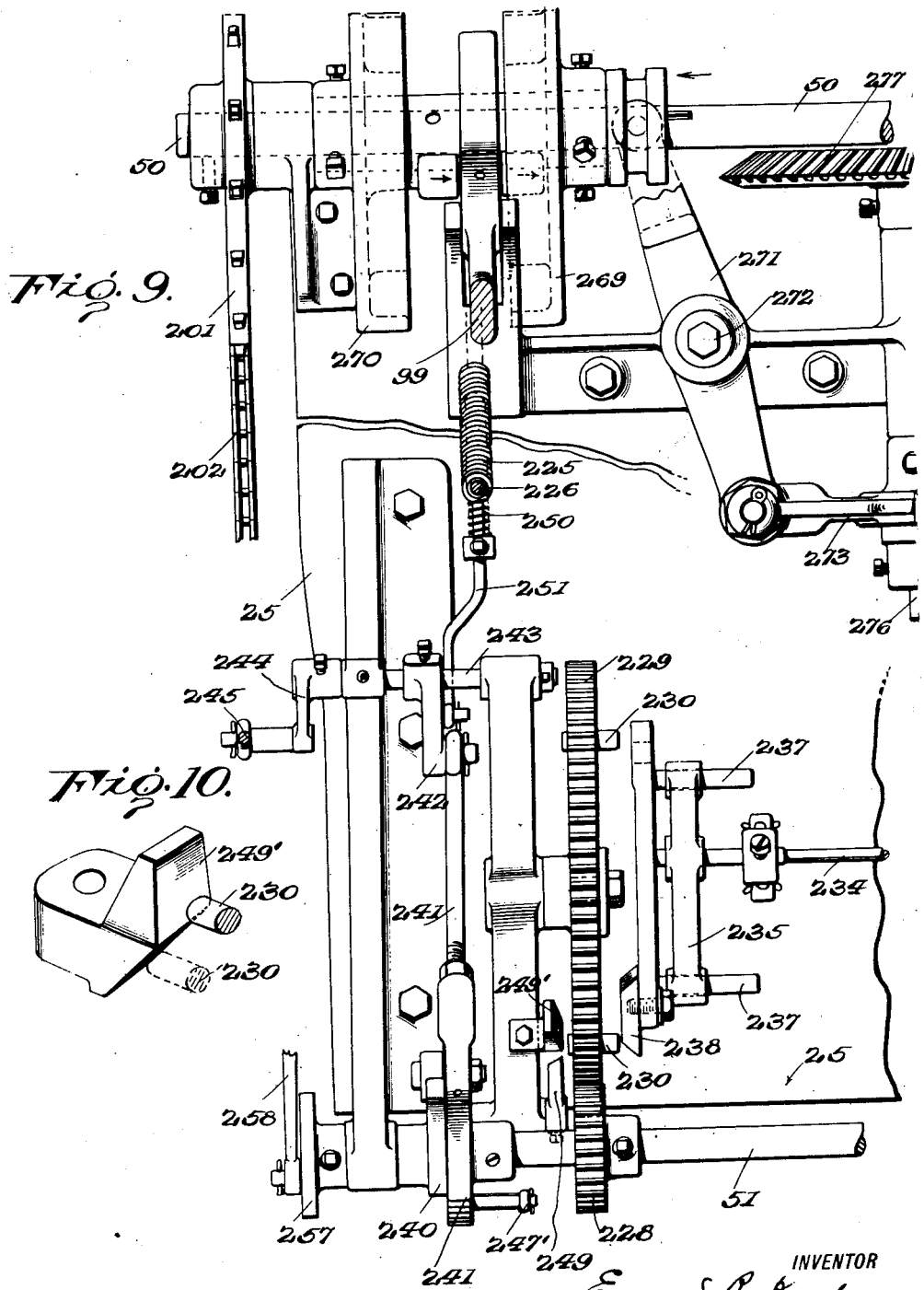

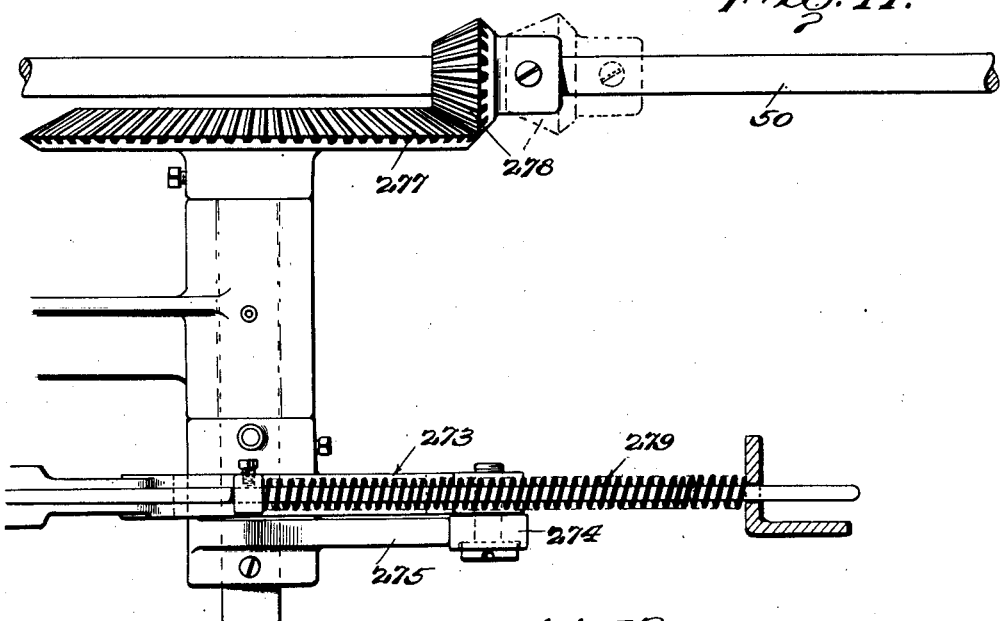
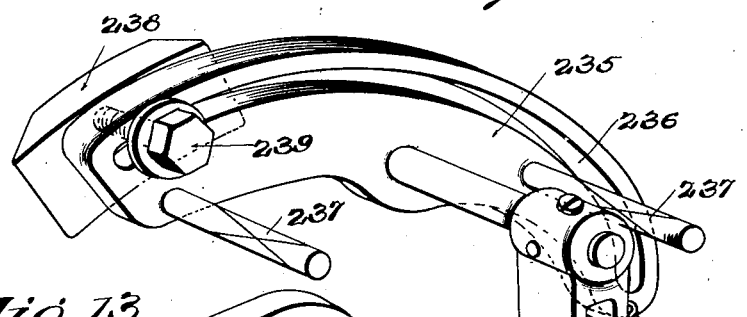
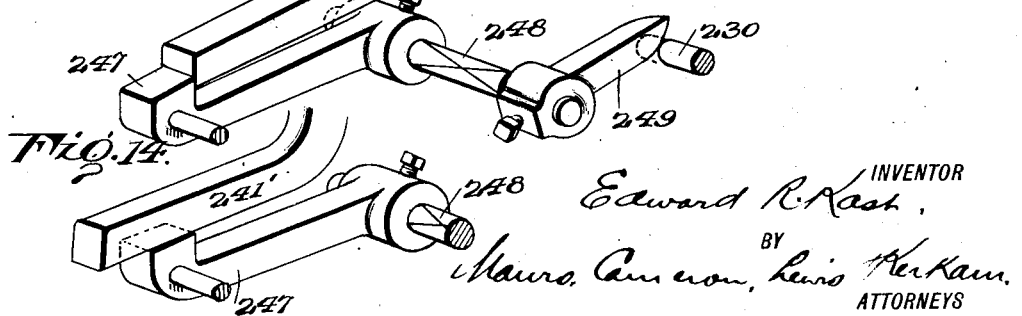

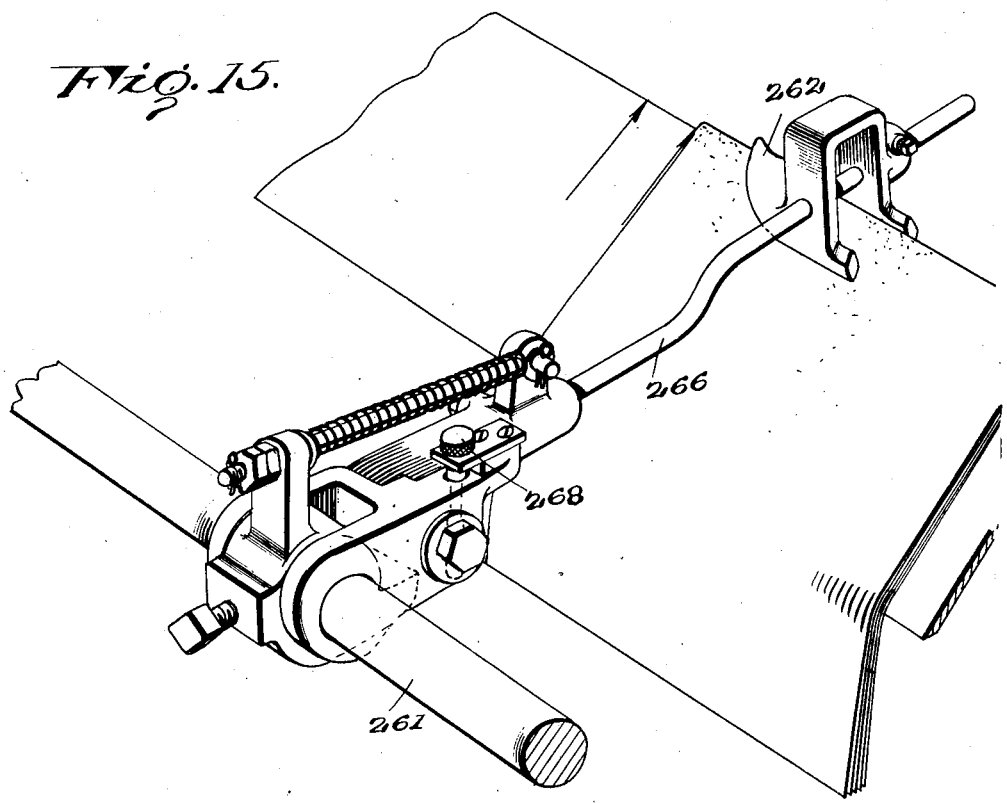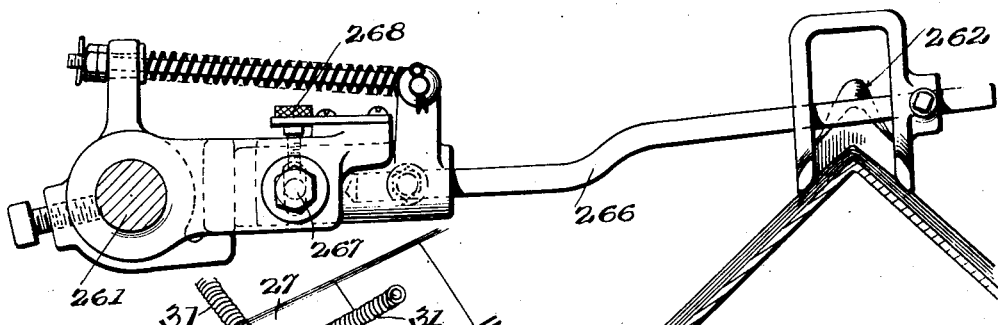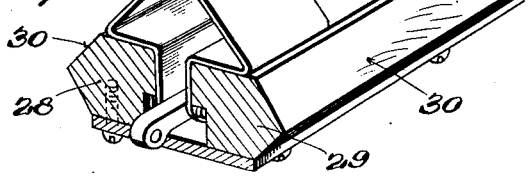

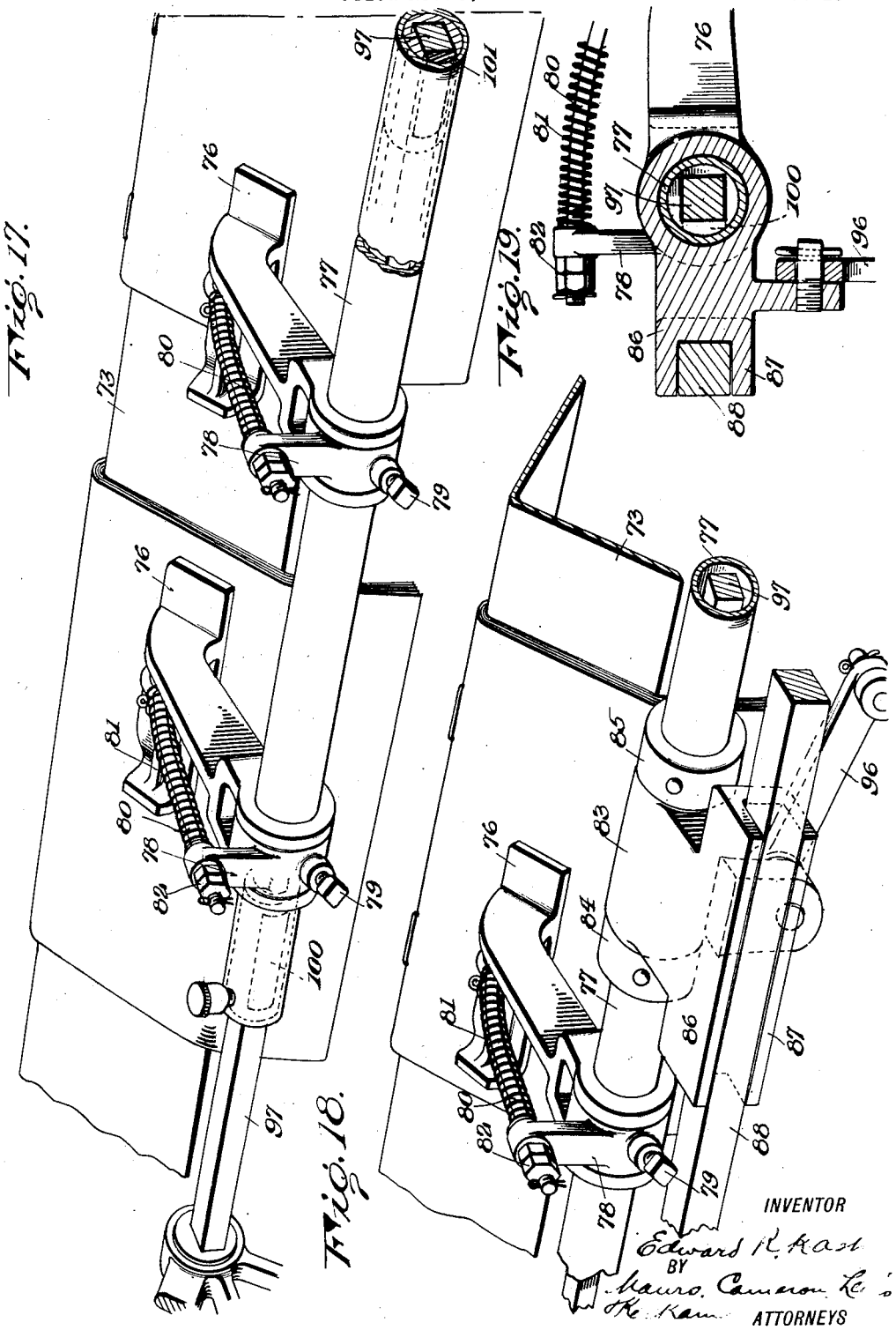

Patented Oct. 4, 1927.

1,644,192

UNITED STATES PATENT OFFICE.

EDWARD R. KAST, OF PEARL RIVER, NEW YORK, ASSIGNOR, BY MESNE ASSIGNMENTS, TO DEXTER FOLDER COMPANY, OF NEW YORK, N. Y., A CORPORATION OF NEW YORK.

MACHINE FOR ASSEMBLING AND STITCHING SIGNATURES.

Application filed November 8, 1922. Serial No. 599,701.

The present invention relates to machines for assembling and stitching signatures, and the particular object of the invention is to provide an improved machine in which the operation of the stitching mechanism is controlled from a calipering device; that is to say, when the assembled signatures that pass under the calipering device are for any reason defective the stitching mechanism will be automatically disconnected upon the passage of said defective book. The invention further resides in the provision of an improved automatic delivery provided with means controlled by said calipering mechanism whereby the defective book or books are automatically delivered in a separate path from that of the good hooks.

While in the drawings, the invention has been shown as embodied in what is known as a "stitcher feeder", that is to say a device for assembling and stitching signatures in which the groups of assembled signatures are put on the machine manually, it is to be understood that the signatures may be assembled and fed to the machine as shown in my Patent No. 1,236,181.

The invention further resides in numerous improvements that are illustrated in the drawings and that will be hereinafter described and claimed.

The invention will be more fully understood by reference to the accompanying drawings illustrating one expression of the inventive idea and wherein—

Figs. 1 and 1ª are a side elevation of the improved machine;

Figs. 2 and 2ª are a plan view showing particularly the driving connections;

Fig. 3 is a perspective view of the improved calipering device;

Fig. 3ª is a detail of the calipering member that engages the groups of signatures;

Fig. 4 is a detail in perspective of part of the calipering device;

Figs. 5 and 6 are details of the adjustment member used on the caliper;

Fig. 7 is a perspective view of the delivery end of the device;

Figure 1:
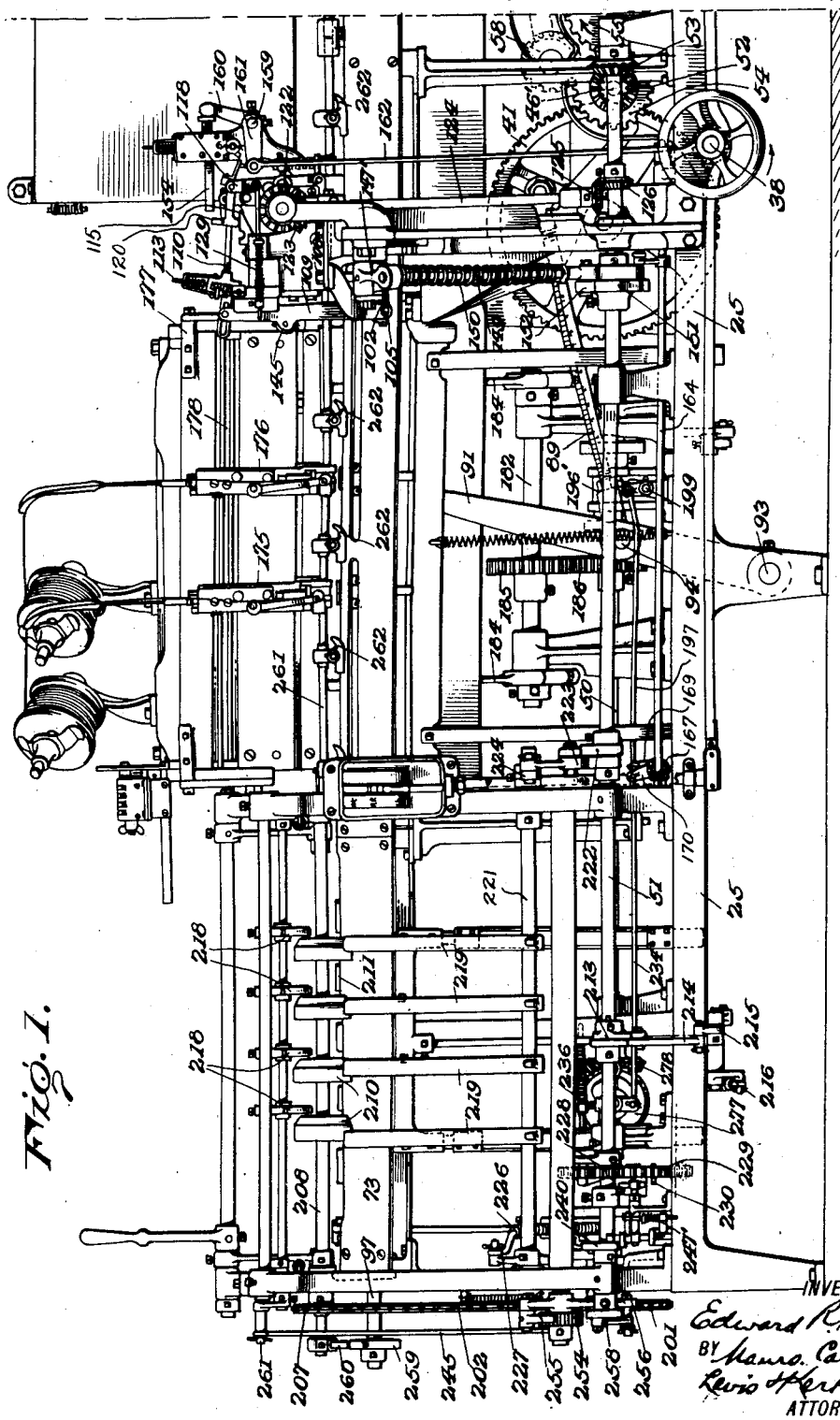

Figs. 8 and 8ª are a perspective view showing particularly the mechanism for controlling the stitchers and the means for staggering the stitches in the books;

Fig. 9 is a plan view of the means for staggering the stitches;

Fig. 10 is a detail showing the cam for resetting the pins carried by the tripping gear;

Fig. 11 is a detail illustrating the means for driving the stitch-staggering mechanism;

Fig. 12 is a detail of part of the means for setting the pins on the tripping gear;

Figs. 13 and 14 are details of parts associated with the switch mechanism;

Figs. 15 and 16 are views showing the holding clamps for the signatures as they are stitched;

Figs. 17, 18 and 19 are details showing the mounting of the feeding clamps that progress the books past the stitchers;

Fig. 20 is a detail view of the mounting of the conveyor chain;

Fig. 21 is a detail of the clutch for controlling the stitching mechanism;

Fig. 22 is a detail of the means for holding the pins in position in the tripping gear; and Fig. 23 is a perspective view of the bushing.

Referring to the drawings wherein similar letters of reference indicate like parts, 25 is the frame of the machine of any suitable or desired construction. As here shown, signature supports 26 are provided on which the signatures are placed in open position by the operators at the several stations, and means are provided for removing the signatures from these supports and progressing the same in open position past the calipering device, under the stitches and to the delivery. These means preferably embody a conveyor 27 that is mounted upon and moved along rods or strips 28 and 29, the faces 30 of these strips being inclined to continue the surfaces of the inverted V-shaped faces of the conveyor 27 and thus hold the leaves of the signatures away from the standards 27' (Fig. 20). Pins 31 carried by the conveyor act to remove the groups of signatures from the supports 26 and feed the same forward to the reciprocating mechanism that progresses the books past the caliper and stitching mechanism to the delivery. The continuous conveyor is driven from a sprocket 32 (Fig. 1ᵃ) and said conveyor passes around idler sprockets 33, 34 and 35.

*The drive.*—The sprocket 32 is mounted on a shaft 36 (Fig. 2ᵃ) which is driven from an electric motor 37 which drives shaft 38 through a chain 39 passing around sprockets on the armature shaft and on shaft 38. Shaft 38 carries a pinion 40 which meshes with a crank gear 41 mounted on shaft 42. It is from this crank gear that is driven the reciprocating mechanism for feeding the books past the caliper and stitchers to the delivery, as hereinafter more fully set forth.

Shaft 42 carries a gear 43 meshing with an idler 44, which latter meshes with a gear 45 mounted on a shaft 46. Shaft 46 carries a plurality of gears, here shown as four, and is adapted to drive a shaft 47 which is provided with associated gears. Shaft 36 is driven from shaft 47. The gears on shafts 46, 47 and 36 constitute a well-known transmission for modifying the speed of the conveyor 27. For example, if the pins on the conveyor are set eighteen inches apart, the speed of the chain may be cut down to half of what it was when the pins were set at thirty-six inches apart, thus making it easier for the operator and at the same time securing exactly the same production.

This transmission also modifies the relative speed of the conveyor chain 27 on the one hand and the calipering mechanism, the fly at the delivery, the tripping mechanism for the switch to separate the good and the bad books, and the knife for elevating the books at the delivery. The stitching mechanism and the means for staggering the stitches in the book, hereinafter more fully referred to, always run one to one with the crank gear 41; that is to say, for each revolution of the crank gear the stitching device will operate once. This is effected by means of bevel gears 48 mounted on shaft 42 and 49 mounted on the rear cam shaft 50, which latter controls the stitching mechanism and the means for staggering the stitches.

The calipering mechanism, the fly at the delivery, the tripping mechanism for the switch, and the knife elevating the books into the delivery, are operated from the front cam shaft 51 which latter is driven from a shaft 46' through bevel gears 52 and 53. Shaft 46' is in axial alinement with shaft 46, but is independent thereof, so that shaft 46' must be driven through the transmission. As shown, shaft 46' carries a gear 54 that meshes with a gear 55 carried by shaft 47.

The maximum output on the machine is secured when the work is run what is known in the art as "one up"; that is to say, when there is a sufficient number of stitcher heads on the machine so that the requisite number of stitches is put in any given piece of work on one movement of the stitcher and, accordingly, on one revolution of the crank gear 41. The variations of work are, however, such that with any given number of stitcher heads, say two, it is necessary, if it is desired to put four stitches in any given piece of work, to operate the stitcher twice. This is known as "two up" work. If, with any given number of stitcher heads, it was necessary to operate the stitcher three times to insert the requisite number of stitches, such work would be known as "three up" work; and similarly for "four up" work.

It will be understood that, if the machine is running two up, each book will be thrown at each reciprocation of the machine only half the distance as if the machine were running one up, and, if the machine were running three up, one third the distance, and if four up, one fourth the distance. And, similarly, if running four up, for example, the cailpering mechanism and the front cam shaft 51 of the machine would be running only one fourth as fast as when the machine was running one up. In other words, by this transmission mechanism, any desired relation may be secured between the conveyor 27 and the front cam shaft 51 for the adjustment of their relative speeds, in view of the work that must be done with any given number of stitcher heads.

This transmission is of any usual or well known construction. If it is desired to run the machine one up, gear 56 on shaft 46 drives gear 57 on shaft 47 through an idler gear 58 carried by an arm 59 which is movable along a rod 60. If it is desired to run the machine two up, gear 61 on shaft 46 will drive gear 62 on shaft 47 through the intermediary of said gear 58. If it is desired to drive the machine three up, pinion 63 on shaft 46 will drive gear 64 on shaft 47 through said gear 58; and, if four up, pinion 65 on shaft 46 will drive gear 66 on shaft 47 through said gear 58. Through the connections described, the speed of the cam shaft 51 will be controlled.

The speed of the conveyor chain 27 is controlled through the gears 67, 68 and 69 on shaft 36. These gears are shiftable along the said shaft by the shifter rod 70, there being the usual feather connection 71 between said gears and said shaft 36. If, for example, it be desired to drive the conveyor chain 27 at a relatively high speed as, for example, when the pins 31 are placed thirty-six inches apart, the gear 67 is meshed with gear 66; if a slower speed is desired, as when the pins 31 are placed twenty-seven inches apart, for example, gear 68 is moved into mesh with gear 64; and, if a still slower speed of travel of the conveyor chain is desired, as when the pins 31 are placed eighteen inches apart, for example, gear 69 is meshed with a gear 72 on shaft 47.

It will thus be observed that, for any given job, it is simply a matter of selection of gears to effect the desired speeds of the conveyor 27 and the cam shaft 51.

*Reciprocating means for feeding the books past the stitchers.*—The continuous conveyor 27 progresses the books onto the saddle proper 73 on which the books are stitched. Preferably, the books pass under one or more guide rollers 74 before they are engaged by the calipering mechanism, and after the books pass from under the influence of the continuous conveyor they are seized by reciprocating mechanism that operates to feed them past the stitchers to the delivery. This feed mechanism comprises a longitudinally extending bar 75 carried in a slot in one face of the saddle, the books being held against this bar by a plurality of feed clamps 76 (see Fig. 8). Each of these feed clamps is loosely mounted on a tube 77, to which tube is fixedly secured an abutment 78 by means of a set-screw 79. A rod 80 carrying a spring 81 passes through said abutment and engages the feed clamp. A pair of set-screws 82 are secured on the end of said rod 80. The tube 77 projects loosely through a casting 83, and relative longitudinal movement of said casting and tube is prevented by a pair of collars 84 and 85 secured on said tube 77. Said casting 83 has integral therewith an upper guide member 86 and a lower guide member 87 that engage opposite surfaces of a guide rod 88. The bar 75 and the tube 77 are reciprocated from the crank gear 41 by means of an adjustable connecting rod 89, one end of which carries a block engaging a slide 90 on said crank gear 41, and the other end of which is connected to a pair of upright levers 91 and 92 pivoted at 93 and connected together at 94. The extent of the throw of the books is determined by the adjustment of rod 89 along said side 90. The upper end of lever 91 is connected to one end of a link 95, the other end of which is secured to the under side of bar 75. The upper end of lever 92 is secured to one end of a link 96, the other end of which link is connected to the casting 83. Through these connections, the tube 77 carrying the feed clamps 76, and the feed bar 75, are reciprocated in unison.

Projecting through the tube 77 is a square shaft 97 on one end of which is secured an arm 98 (see Fig. 7), the free end of said arm 98 being connected to a cam strap 99, which strap is operated by a cam (as will be hereinafter more fully described) to oscillate said square shaft on its longitudinal axis. The tube 77 is reciprocated along this square shaft, and at each end of said tube there is provided a bushing 100. In order to compensate for wear on this bushing due to reciprocation of the tube 77 and said bushing on said square bar 97, a part 101 of said bushing (Fig. 23) which is subject to wear is made removable so that it may be replaced by a new part as occasion requires.

It will be observed that, as the square shaft 97 is oscillated on its longitudinal axis, the tube 77 is similarly rocked. As the square shaft 97 is rocked in a counter-clockwise direction (as seen in Figs. 17, 18 and 19), it will be seen that, through the abutment 78 engaging the set-screws 82, the feed clamps will be removed from feeding engagement with the books. When said bar is rocked in a clockwise direction, the feed clamps will hold the books against the bar 75 through the yielding action of the spring 80. Hence there is provided a highly efficient and simple mechanism for effecting the longitudinal reciprocation of the feed clamps 76 as well as the lateral movement of said clamps toward and from the books. The provision of the guide member 88 insures a steady, easy, longitudinal movement of the parts, and the arrangement of the squared shaft within the tube 77, so that the former may rock the latter and the latter be reciprocated on the former, affords a construction of great strength, simplicity and efficiency.

*The calipering mechanism.*—The calipering mechanism is interposed between the continuous conveyor 27 and the stitching mechanism in order to guard against the stitching of a defective book and to insure the delivery from the machine of perfect books. The signatures are calipered on the saddle, and, as particularly shown in Figs. 3 and 3ª, the calipering member 102 that engages the assembled signatures is a metal segment struck on the arc of a circle which is normally slightly elevated above the level of the saddle to permit easy passage thereunder of the signatures. Every part of the calipering surface is the same distance from the center so that accuracy of engagement is secured, and none of the disadvantages of a rotary caliper is obtained. The segment is pivoted at 103 in the short arm 104 of a bell-crank lever which in turn is pivoted at 105 in depending arms 106 forming part of the calipering casting, which latter is secured to a standard 107 at 108. The other arm of said bell-crank lever is indicated by 109 and the upper end of said lever has a pin-and-slot connection with a link 110 which in turn is connected to the short arm 111ª of a rocking bell-crank lever 111 (Fig. 4) pivoted to the frame of the machine at 111ᵇ) the short arm of said lever being connected to link 110, which link is provided with a knurled wheel or surface 112 by means of which it may be turned for adjustment of the parts, and a spring-pressed plunger 113 for holding said knurled wheel in its adjusted position. The bell-crank arm 111 carries on its outer end a laterally projecting squared lug 114, as clearly shown in Fig. 4.

Mounted to reciprocate on the framework of the machine is a movable member such as a T-shaped slide 115 which is held in place to reciprocate in suitable ways by means of a plate 116, and on the opposite end from the T is a transverse groove 117. A lever 118 pivoted at 119 to the framework of the machine projects upwardly and, on its upper end, has a pawl 120 provided with a rounded nose engaging in the groove 117 on the sliding T-bar 115 to reciprocate the latter. The movable parts of the caliper are driven from a shaft 121 (Fig. 3). This shaft is provided with a bevel gear 122 meshing with a similar bevel gear 123 carried on the upper end of a vertical shaft 124. The lower end of this shaft 124 carries a bevel gear 125 which meshes with a similar bevel gear 126 keyed to the front cam shaft 51. Mounted on shaft 121 is a cam 127 which engages lever 118 preferably through the medium of a friction roll 128. A suitable spring 129 carried by a rod 130, one end of which is secured to the lever 118, acts to hold the lever 118 in operative engagement with the cam 127. A spring 131 carried on a rod 132, which latter projects through an abutment 133 on lever 118, acts to yieldingly hold the pawl 120 in engagement with the groove 117, said pawl being provided with a bracket 134 to the under side of which is secured a bearing member 135 that engages the upper end of said rod 132. A spring 136 normally tends to lower the arm 111 of the bell-crank lever that carries the squared lug 114.

On one side of the sliding T-bar 115 there is formed a groove 137 the dimensions of which are such as to just receive freely and easily the squared lug 114 on the end of the lever 111 when a perfect book passes under the calipering member 102. In order to effect a finer calipering adjustment, a plate 138 is mounted on the head of said T-bar 115 in such position that the edge 139 thereof may be moved to contract or enlarge the space through which the squared lug 114 passes. This plate is secured in position by screw members 140 and 141 engaging respectively in slots 142 and 143.

Mounted on shaft 121 is a second cam 144 that engages an arm 145 secured to bell-crank arm 109 and rocks the same to elevate the calipering member 102. This calipering member is moved into engagement with each book by a spring 146 that normally holds the cam 144 and arm 145 in engagement. It has been found, however, that mere spring pressure of this kind is inefficient for perfect calipering and, in view of the fact that it is necessary in practice to caliper within two thousandths of an inch, an additional means for pressing the calipering element into engagement with the books has been provided. As here shown, a lever 147 engages the upper surface of the calipering element. Said lever is pivoted at 148 to the standard 107. An upwardly extending cam strap 149 projects through an opening in arm 147' of said lever. A spring 150 is carried by said cam strap and engages the under side of said arm 147'. A cam 151 operates through roller 152 to elevate said cam strap and arm 147' and, accordingly, to depress the arm 147 and calipering member 102, the power from the cam being applied yieldingly through the spring 149.

If a defective book—for example one having an insufficient number of signatures—should pass under the calipering member 102, the arm 111 would be slightly elevated so that the squared shoulder 139 of the groove 137 is engaged by the lug 114, and the sliding T-bar 115 is thus held against movement. On the other hand, if the assembled signatures are numerically greater than the predetermined number, arm 111 will be rocked downwardly and lug 114 will engage the squared shoulder 153 on the head of the bar 115, and said bar will be held against movement. When the sliding bar is restrained from movement, the action of the cam 127 in forcing the lever 118 to the left (Fig. 4) causes the rounded nose on the pawl 120 to release its hold on the groove 117, the spring 131 yielding for this purpose, and the nose of the pawl then travels rearwardly on the upper surface of the T-bar. Accordingly, the rear face of the head of the pawl 120 strikes a slide 154 provided with a notch 155 and moves the same rearwardly until a vertical plunger 156, pressed downwardly by a spring 157 reacting between said plunger and a bracket 158, engages in said recess. The rearward movement of this slide causes the rocking of the shaft 159 through an arm 160 carried by said shaft, which arm is engaged by the end of said slide 154. The shaft 159 has mounted thereon a second arm 161 to the free end of which is connected one end of a vertically extending rod 162. The lower end of said rod 162 is secured to the free end of an arm 163 carried by a shaft 164. Secured to said shaft is one end of a push spring 165, the other end of which is anchored to the frame of the machine. This spring tends to move the arm 160 through the connections just described toward the left as seen in Fig. 3. Shaft 164 is provided with a bevel gear 166 meshing with a similar bevel gear 167 on a shaft 168.

As will be observed, upon the passage of a defective book, the shaft 168, through the connections described, is slightly rocked. This shaft is provided with an arm 169 from which is operated mechanism for disconnecting the stitching mechanism. It is also provided with a second arm 170 to which is connected mechanism for throwing the switch at the delivery. The engagement of the plunger 156 in the recess 155 insures that the parts shall be locked in position until after the stitcher has been tripped and the switch at the delivery has been operated.

This plunger 156 carries at its lower end a roller 171 that is adapted to be engaged by a member 172 carried on a rod 173. A spring 174 encircles said rod 173 and is connected to the rotary member 172 to adjust the tension on the same. If, after the parts have been moved as described upon the passage of a defective book, the next book should be a good one, the pawl 120 will engage the recess 117, thus permitting the bracket 134 to be elevated by spring 131, whereupon the bracket will be in a position to engage the member 172 and force the same into engagement with the roller 171 (as shown in Fig. 4) for the purpose of elevating the plunger 156 out of the recess 155, whereupon the notched slide 154 will be returned to the position shown in Fig. 4. under the influence of spring 165. In other words, the bracket 134 only engages the rotary element 172 to elevate the plunger 156 when a good book passes the caliper after the caliper has once been tripped by the passage of a defective book. When a good book is calipered, the pawl 120 passes under the slide 154 and does not engage the same.

*Control of the stitching mechanism.*—As shown in Fig. 1 two stitching heads 175 and 176 of a well known construction are mounted on the stitcher frame 177, said heads being longitudinally adjustable along a slot 178 in said frame. The driving rail 179 for the stitcher is shown in Fig. 8, this rail being carried in rock arms 180 mounted on a rod 181, said arms being rocked from a shaft 182 on which are mounted eccentrics 183, said eccentrics moving arms 180 through eccentric rods 184. Shaft 182 is provided with a gear 185 that meshes with a similar gear 186 mounted on the rear cam shaft 50. This gear 186 is loosely mounted on shaft 50 and is connected to a sleeve 186′ which is provided with a notch 187 (Fig. 21). A disk 188 is keyed to shaft 50 at 189. Said disk is provided with a cutaway portion 190 in which is mounted for radial movement a plunger 191 provided with a laterally projecting lug or roller 192. This plunger is normally forced radially outward by a spring 193 to hold the same in the recess 187 in order to impart movement to the gear 186. When the plunger 191 is removed from the recess 187, the gear 186 will cease rotating and the stitching mechanism will cease functioning. Accordingly, means have been provided for forcing the plunger 191 out of said recess 187 upon the passage of a defective book. As shown particularly in Fig. 3, a crescent-shaped member 194 is carried by a pair of arms 195 and 196, which latter have suitable bearings in a casting 196′ (Fig. 8). When the shaft 168 is rocked as heretofore described, the crescent-shaped member 194 will be moved toward the abutment 192 on the plunger 191 so that said abutment will engage said member 194 and be forced inwardly against the pressure of spring 193, thus removing the plunger 191 from the recess 187 and disconnecting the stitching mechanism. Any suitable means for this purpose may be employed, as for example a link 197, one end of which is connected to arm 169 and the other end to arm 198, shaft 199 and arm 200, the latter engaging rod 196. The crescent-shaped member 194 will be moved out of engagement with abutment 192 upon the passage of a perfect book by the operation of spring 165.

*Operation of the delivery mechanism.*—On the end of the rear cam shaft 50 is mounted a sprocket wheel 201 around which passes a sprocket chain 202. This chain passes over a sprocket wheel 203 on a stub shaft 204 under a sprocket wheel 205 on shaft 206 and over sprocket wheel 207 on shaft 208. Shaft 206 carries one set of delivery rolls 209 and shaft 208 carries a second set of delivery rolls 210. Through the connections described, these rolls operate in opposite directions. A knife 211 carried by upright members 212 is vertically reciprocated from front cam shaft 51 by a cam 213, a cam strap 214 and a pivoted lever 215. A spring 216 operates to return the parts after they have been cam actuated. The delivery knife is made in two parts, one of which 211′ (Fig. 7) is made removable because of the fact that different sizes of books are presented to the delivery at different points.

Mounted on a rod 217 is a plurality of switches 218. These switches are normally set so that good books are received by the fly members 219 and deposited on off-bearing delivery belts 220. The fly members 219 are mounted on a shaft 221, and said shaft is rocked by a cam 222 operating through a cam strap 223, the upper end of which latter is connected to the free end of the arm 224 secured to said shaft 221. A spring 225 carried by a rod 226, which latter is connected to the free end of an arm 227 carried by shaft 221, acts to operate the fly after it has been cam-actuated.

Mounted on the cam shaft 51 is a pinion 228 that meshes with a gear 229. This gear carries a plurality of pins 230, here shown as three. As illustrated particularly in Fig. 22, each pin is provided with a pair of notches 231 and 232, and a spring-pressed plunger 233 operates to engage in one notch or the other, dependent upon the position in which the pin has been moved.

Figure 2A:
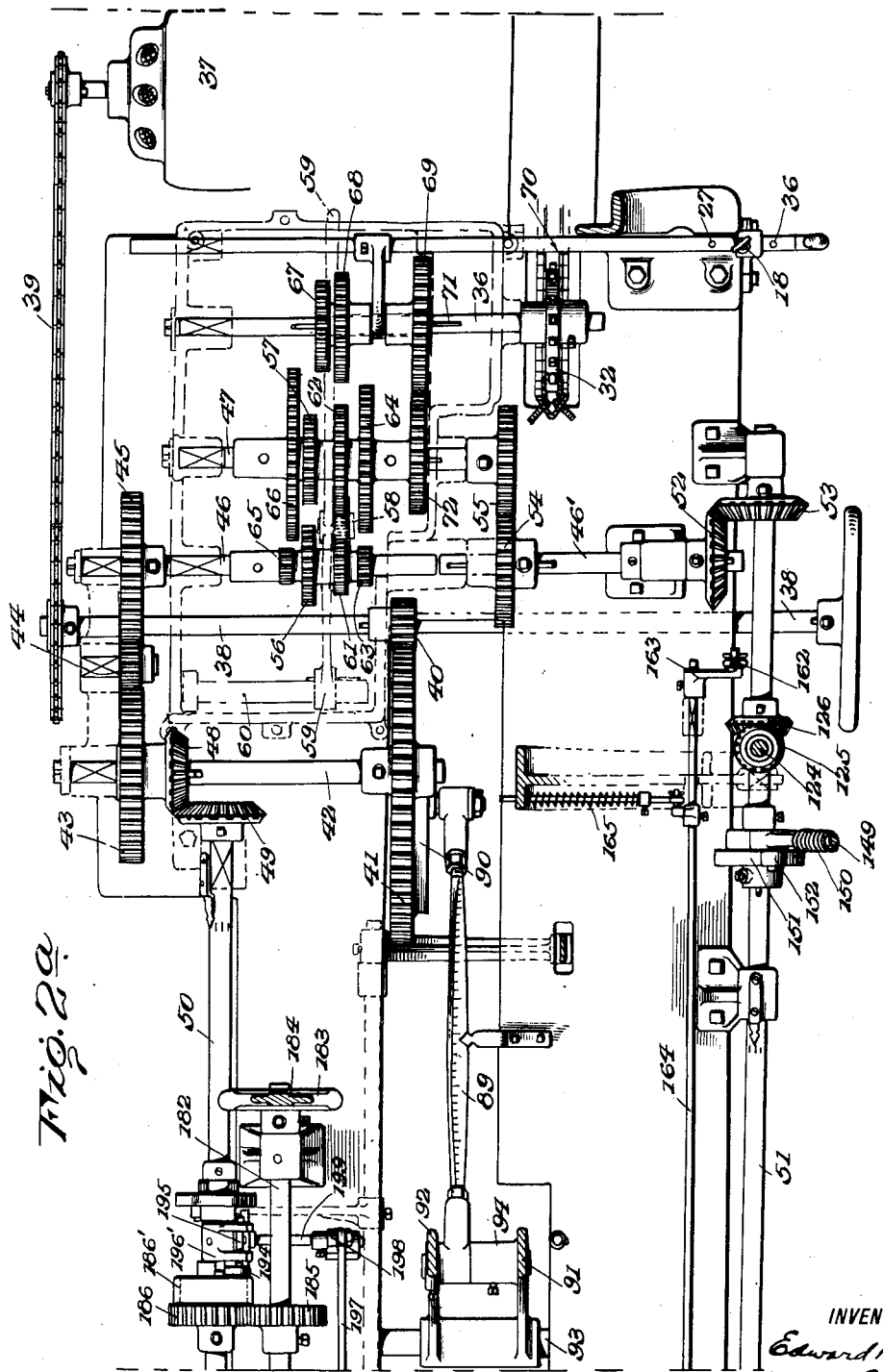

Upon the passage of a defective book, the arm 168 is rocked as heretofore explained, whereupon movement is communicated through arm 170 to a link 234 moving the same toward the left as shown in Figs. 3 and 7. This link is connected to an arcuate member 235 provided with a slot 236, said member having supporting rods 237 engaging in suitable bearings 237' (Fig. 2). A block 238 is adjustable along said slot 236 by means of a bolt 239, to alter the time of engagement of said block 238 with said pins 230. When the link 234 is moved toward the left as explained, the block 238 will be moved into the path of rotation of said pins 230. When a pin is engaged by said block, it will be moved into the position shown in dotted lines in Figs. 13. It is then in a position to operate the switch mechanism.

As particularly shown in Figs. 7 and 13, a cam 240 on shaft 51 is adapted to engage a cam strap 241, one end of which is connected to the free end of an arm 242 secured on shaft 243. A second arm 244 on said shaft 243 is connected with a vertically extending rod 245 which in turn is connected to an arm 246 secured to rod 217 on which the switch members 218 are mounted. Under normal conditions, that is to say, when good books are being delivered, the lower bifurcation 241' of the cam strap 241 will be held in the position shown in Fig. 13 by a locking member 247 mounted on a stub shaft 248 which shaft is also provided with a trip member 249. In this position, the cam 240 is free to rotate on shaft 51 without influencing or moving the cam strap 241. When, however, a pin is set by reason of the passage of a defective book, the pin so set, and occupying the position shown in dotted lines in Fig. 13, will, upon the rotation of the tripping gear 229, engage the under side of the trip member 249 and rock said locking member downwardly to the position shown in Fig. 14. Thereupon under the influence of spring 250 carried by a rod 251 and connected to arm 242, the cam strap will be moved forwardly as shown in Figs. 7 and 14, whereupon the switch members will be moved to the position to discharge a bad or defective book. The parts will be returned to the position for delivering good books by the cam 240 engaging the roller 241' and returning the cam strap to its original position, at which time the spring 247' (see Fig. 7) will elevate the locking member 247 to hold the cam strap in its retracted position.

The pins 230 are returned to their normal inoperative position by means of a stationary cam 249' (Figs. 9 and 10) secured to the frame of the machine in the path of said pins.

The delivery belts pass around shafts 252 and 253. On shaft 252 is mounted a ratchet 254 which is engaged by a pawl 255 carried in the upper end of a slotted arm 256. A crank 257 on cam shaft 51 has connected thereto one end of an arm 258, the other end of which engages in slotted arm 256, thus providing means for adjusting the speed of rotation of said shaft 252 through said pawl and ratchet.

*Operation of holding clamps.*—When the books are being stitched, it is necessary to hold them securely on the saddle, and means are provided for effecting this at the time the feed clamps 76 are out of engagement with the books. As shown particularly in Fig. 7, an arm 259 is mounted on the end of the squared rock shaft 97. This arm is positioned so that, as the feed clamps are rocked into engagement with the books, said arm 259 will engage an arm or finger 260 mounted on a bar 261, which bar carries the holding clamps 262 and, accordingly, these clamps are rocked out of engagement with the books when the feeding clamps are rocked into engagement with the same, and vice versa. The holding clamps are shown in detail in Figs. 15 and 16. They are rocked out of engagement with the books by the arm and are rocked into engagement with the books by a spring 263. The spring 263 is carried by rod 264 which is connected to an arm 265 secured on the member 261. As shown particularly in Figs. 15 and 16, each holding clamp is mounted on an arm 266. If desired, the said clamps may be made in two parts pivoted together at 267 for the purpose of adjustment by means of set-screws 268. The operation of the holding clamps by the means that control the feeding clamps so that one goes into action as the other goes out, is a feature of importance.

*Mechanism for staggering the stitches.*— In commercial operation, it has been found necessary to stagger the stitches in books, magazines, and the like in order that they may be efficiently and effectively piled or bundled. Many solutions of this problem have been advanced, including spacing the pins at different distances on the continuous conveyor, altering the throw of the reciprocating mechanism, reciprocating the stitchers themselves, and the like. None of these proposals have been practical. The problem has, however, been solved in the present device by the expedient of varying the time of engagement of the feed clamps on alternate books. In other words, for one book the time of engagement of the feed clamps that progress the books past the stitching mechanism is slightly in advance of that for the next book, and for the third book the timing will be that for the first book. In other words, the timing for alternate books will be the same. One means for effecting this result is the provision on shaft 50 of a pair of cams 269 and 270 which are mounted to be moved longitudinally of said cam shaft by a shifter 271 pivoted at 272, which latter has connected thereto an arm 273 carrying a roller 274 that engages a cam 275 mounted on a shaft 276. The latter carries a gear 277 that is driven by a pinion 278 on the shaft 50. A spring 279 returns the parts to their normal position after they have been cam actuated. The cams 269 and 270 operate to rock the squared shaft 97, as heretofore set forth, through the medium of cam strap 99 and arm 98. Cam 270 is set slightly in advance of cam 269. The shifter 271 moves said cams so that first one is in engagement with the said cam strap 99 and then the other; and, accordingly, the time of engagement of the feed clamps with the books, and accordingly the position of the books under the stitching mechanism, are controlled and the stitches are staggered. The amount of stagger depends upon the relative adjustment of cams 269 and 270. If it should be desired to uncouple the mechanism for staggering the stitches, this can be readily effected by slipping the pinion 278 out of mesh with the gear 277 and leaving either cam 269 or cam 270 in engagement with the cam strap 99. Under these conditions the rocking of the square shaft 97 will not be varied and hence the stitches in all of the books will be uniform. The relative placing of the stitches in alternate books is illustrated in Fig. 8. In books A and B, the stitches are similarly placed, and in books C and D the stitches are similarly placed.

While, for the purpose of illustration, one expression of the inventive idea has been illustrated and described, it is to be understood that the invention is not limited thereto, and that the inventive idea may be embodied in various mechanical expressions within the limits of the appended claims.

What is claimed is:—

1. In a device of the character described, the combination of a support along which signatures are progressed, a calipering element engaging said signatures on said support, a shaft rotatable from said calipering element upon the passage of a defective book, stitching mechanism operating on said signatures as they are progressed along the support, delivery mechanism provided with means for separating the good from the bad books, connections between said shaft and stitching mechanism for disconnecting the latter upon the passage of a defective book, and independent connections between said shaft and delivery mechanism for separating the good from the bad books.

2. In a device of the character described, the combination of signature-supporting and progressing mechanism by which groups of signatures are maintained and moved in open position, a calipering element engaging said opened signatures as they are progressed, a shaft rotatable from said calipering element upon the passage of a defective book, stitching mechanism operating on said signatures as they are progressed along the support, delivery mechanism provided with means for separating the good from the bad books, connections between said shaft and stitching mechanism for disconnecting the latter upon the passage of a defective book, and independent connections between said shaft and delivery mechanism for separating the good from the bad books.

3. In a device of the character described, the combination of a signature support, progressing mechanism by which groups of signatures are maintained and moved in open position, a calipering element movable into and out of engagement with the signature groups, and means for varying the speed of movement of said calipering element.

4. In a device of the character described, the combination of a signature support, progressing means by which groups of signatures are moved in open position, stitching mechanism, means for disconnecting said stitching mechanism upon the passage of a defective book, delivery mechanism including a switch for separating the good from the defective books, and means for varying the timing of said switch.

5. In a device of the character described, the combination of a signature support, progressing means by which groups of signatures are moved in open position, stitching mechanism, means for disconnecting said stitching mechanism upon the passage of a defective book, delivery mechanism including a switch for separating the good from the defective books, a tripping gear, a plurality of pins carried thereby, means for setting one of said pins upon the passage of a defective book, and means for varying the timing of said setting means.

6. In a device of the character described, the combination of signature-supporting and progressing mechanism by which groups of signatures are maintained and moved in open position, a calipering element engaging said opened signatures as they are progressed, a shaft rotatable from said calipering element upon the passage of a defective book, stitching mechanism operating on said signatures as they are progressed along the support, delivery mechanism provided with means for separating the good from the bad books, connections between said shaft and stitching mechanism for disconnecting the latter upon the passage of a defective book, and independent connections between said shaft and delivery mechanism for separating the good from the bad books, said calipering element being sector-shaped.

7. In a device of the character described, the combination of signature-supporting and progressing mechanism by which groups of signatures are maintained and moved in open position, a calipering element engaging said opened signatures as they are progressed, a shaft rotatable from said calipering element upon the passage of a defective book, stitching mechanism operating on said signatures as they are progressed along the support, delivery mechanism provided with means for separating the good from the bad books, connections between said shaft and stitching mechanism for disconnecting the latter upon the passage of a defective book, independent connection between said shaft and delivery mechanism for separating the good from the bad books, a spring operating to engage said element with a book to be calipered, and means for applying additional pressure to said element when in calipering position.

8. In a device of the character described, the combination of signature-supporting and progressing mechanism by which groups of signatures are maintained and moved in open position, a calipering element engaging said opened signatures as they are progressed, a shaft rotatable from said calipering element upon the passage of a defective book, stitching mechanism operating on said signatures as they are progressed along the support, delivery mechanism provided with means for separating the good from the bad books, connections between said shaft and stitching mechanism for disconnecting the latter upon the passage of a defective book, independent connections between said shaft and delivery mechanism for separating the good from the bad books, and cam-operated mechanism applying pressure to said element when in calipering position.

9. In a device of the character described, the combination of signature-supporting and progressing mechanism by which groups of signatures are maintained and moved in open position, a calipering element engaging said opened signatures as they are progressed, a shaft rotatable from said calipering element upon the passage of a defective book, stitching mechanism operating on said signatures as they are progressed along the support, delivery mechanism provided with means for separating the good from the bad books, connections between said shaft and stitching mechanism for disconnecting the latter upon the passage of a defective book, independent connections between said shaft and delivery mechanism for separating the good from the bad books, a spring operating to engage said element with a book to be calipered, and cam-operated mechanism applying additional pressure to said element when in calipering position.

10. In a device of the character described, a stitching mechanism, a calipering mechanism having a reciprocating element, means for stopping the reciprocation of said element upon the passage of a defective book, and means for locking said element until after the stitching mechanism is tripped.

11. In a device of the character described, a stitching mechanism and a delivery mechanism, a calipering mechanism having a reciprocating element, means for stopping the reciprocation of said element upon the passage of a defective book, and means for locking said element until after the stitching mechanism is tripped and the delivery is set.

12. In a device of the character described, a stitching mechanism, a calipering mechanism having a reciprocating element, means for stopping the reciprocation of said element upon the passage of a defective book, means for locking said element until after the stitching mechanism is tripped, and means for resetting the parts of the caliper upon the passage of the next good book.

13. In a device of the character described, a stitching mechanism and a delivery mechanism, a calipering mechanism having a reciprocating element, means for stopping the reciprocation of said element upon the passage of a defective book, means for locking said element until after the stitching mechanism is tripped and the delivery is set, and means for resetting the parts of the caliper upon the passage of the next good book.

14. In a device of the character described, the combination of a signature-support, a feed device for progressing the signatures therealong, a reciprocating support on which said feed device is mounted, and means held against longitudinal movement for moving said device laterally, said support being reciprocated on said means.

15. In a device of the character described, the combination of a signature-support, a bar associated therewith and held against longitudinal movement, means for rocking said bar on its longitudinal axis, a member mounted on said bar to participate in its rocking movement and to be reciprocated therealong, and a feed clamp mounted on said member.

16. In a device of the character described, the combination of a signature-support, a feed device for progressing the signatures along said support, a two-part mounting for said device one part being held against longitudinal movement and the other adapted to be reciprocated, means for rocking one of said parts on its longitudinal axis, and means for reciprocating the other part, one of said parts being mounted on the other.

17. In a device of the character described, the combination of a signature-support, a feed device for progressing the signatures along said support, a two-part mounting for said device comprising a square shaft held against longitudinal movement and a carriage carried thereon, means for rocking said shaft on its longitudinal axis, and means for reciprocating said carriage.

18. In a device of the character described, the combination of a signature-support, a feed device for progressing the signatures along said support, a two-part mounting for said device one part being held against longitudinal movement and the other adapted to be reciprocated, means for rocking one of said parts on its longitudinal axis, means for reciprocating the other part, one of said parts being mounted on the other, and means for steadying said reciprocating member in its travel.

19. In a device of the character described. the combination of a signature support, a feed device for progressing the signatures along said support, a two-part mounting for said device comprising a square shaft and a carriage carried thereon, means for rocking said shaft on its longitudinal axis, means for reciprocating said carriage, a bar extending parallel with the path of movement of said carriage, and connections between said bar and carriage whereby the latter is steadied in its reciprocations.

20. In a device of the character described, the combination of a signature-support, a feed device for progressing the signatures along said support, a holding device for clamping the signatures against said support, and a common element for moving said feeding and holding devices successively toward and from said support.

21. In a device of the character described, the combination of a signature-support, a feed device for progressing the signatures along said support, a holding device for clamping the signatures against said support, and a common element for moving said feeding and holding devices toward and from said support, said feeding device being moved into engagement with the signatures when said holding device is moved out of engagement, and vice versa.

22. In a device of the character described, the combination of a signature-support, a feed device for progressing the signatures along said support, a two-part mounting for said device comprising a square shaft and a carriage carried thereon, means for rocking said shaft on its longitudinal axis, means for reciprocating said carriage, a holding device for clamping the signatures against said support when said feeding device is out of engagement therewith, and means mounted on said square shaft for operating said holding device.

23. In a device of the character described, the combination of a signature-support, a feed device for progressing the signatures along said support, a second support on which said feed device is mounted, a holding device for clamping the signatures against said support when said feed device is out of engagement therewith, a third support on which said holding device is mounted, and connections between said second and third supports whereby the latter is rocked from the former.

24. In a device of the character described, the combination of a signature-supporting surface, a square shaft, means for rocking said shaft, a tubular member carried thereby, means for reciprocating said member on said shaft, a bushing interposed between each end of said member and said shaft, and a feed device carried by said member.

25. In a device of the character described, the combination of a signature-supporting surface, a square shaft, means for rocking said shaft, a tubular member carried thereby, means for reciprocating said member on said shaft, a bushing interposed between each end of said member and said shaft and provided with a removable wear-piece, and a feed device carried by said member.

26. In a device of the character described, the combination of a signature-support, a stitching mechanism adapted to operate on signatures on said support, a feed device for progressing said signatures along said support and presenting them to said stitching mechanism, and means for varying the time of engagement of said feed device with said signatures whereby the stitches placed in said signatures will be staggered.

27. In a device of the character described, the combination of a signature-support, a stitching mechanism adapted to operate on signatures on said support, a feed device for progressing said signatures along said support and presenting them to said stitching mechanism. means for varying the time of engagement of said feed device with said signatures whereby the stitches placed in said signatures will be staggered, and means for disengaging said stitch-staggering means.

28. In a device of the character described, the combination of a signature-support, a stitching mechanism adapted to operate on signatures on said support, a feed device for progressing said signatures along said support and presenting them to said stitching mechanism, and means for engaging said feed device with one group of signatures in advance of the time of engagement with an adjacent group of signatures whereby the stitches in succeeding books will be staggered.

29. In a device of the character described, the combination of a signature-support, a stitching mechanism adapted to operate on signatures on said support, a feed device for progressing said signatures along said support and presenting them to said stitching mechanism, and means for varying the time of engagement of said feed device with succeeding books whereby the stitches placed in succeeding groups of signatures will be staggered.

30. In a device of the character described, the combination of a signature-support, a stitching mechanism adapted to operate on signatures on said support, a feed device for progressing said signatures along said support and presenting them to said stitching mechanism, a second support on which said feed device is mounted, means for rocking said support including a pair of cams timed one in advance of the other, and means for shifting first one and then the other cam into operative position.

31. In a device of the character described, the combination of a signature-support, a stitching mechanism adapted to operate on signatures on said support, a feed device for progressing said signatures along said support and presenting them to said stitching mechanism, a second support on which said feed device is mounted, means for moving said support including a pair of cams timed one in advance of the other, and means for shifting first one and then the other cam into operative position.

32. In a device of the character described, the combination of a signature-support, a stitching mechanism adapted to operate on signatures on said support, a feed device for progressing said signatures along said support and presenting them to said stitching mechanism, a second support on which said feed device is mounted, means for rocking said support including a pair of cams timed one in advance of the other, a sleeve on which said cams are carried, a shaft on which said sleeve is movable, and means for shifting said sleeve whereby first one and then the other cam is moved into operative position.

33. In a device of the character described, the combination of a saddle along which groups of signatures are progressed, delivery mechanism including oppositely rotating delivery rollers, a normally stationary switch arranged above said rollers for separating the good from the bad books, a constantly rotating cam, a cam strap normally uninfluenced by said cam and connected to said switch, means for tripping said strap, and means for moving the same into engagement with said cam.

34. In a device of the character described, the combination of a saddle along which groups of signatures are progressed, delivery mechanism including oppositely rotating delivery rollers, a normally stationary switch arranged above said rollers for separating the good from the bad books, a constantly rotating cam, a cam strap normally uninfluenced by said cam and connected to said switch, means for tripping said strap, and a spring for moving said switch for the discharge of a defective book and moving said strap into engagement with said cam for returning said switch to its normal position.

35. In a device of the character described, the combination of a saddle along which groups of signatures are progressed, delivery mechanism including oppositely rotating delivery rollers, a normally stationary switch arranged above said rollers for separating the good from the bad books, a constantly rotating cam, a cam strap normally uninfluenced by said cam and connected to said switch, means for tripping said strap, means for moving the same into engagement with said cam, and means for varying the speed of rotation of said cam.

36. In a device of the character described, the combination of a saddle along which signatures are progressed, a delivery including oppositely rotating rollers, a pivoted fly and off-bearing delivery tapes to which the books are delivered by the fly, and means for varying the speed of the movement of said fly and tapes.

37. In a device of the character described, the combination of a saddle along which signatures are progressed, a delivery including oppositely rotating rollers, a vertically reciprocating blade for elevating the signatures between said rollers, a pivoted fly for delivering books after they pass said rollers, and means for varying the speed of movement of said blade and fly.

38. In a device of the character described, the combination of a saddle along which signatures are progressed, a delivery including oppositely rotating rollers, a pivoted fly, a spring for moving said fly in one direction, a cam for moving said fly in the opposite direction, and means for varying the speed of rotation of said cam.

39. In a device of the character described, the combination of a saddle along which signatures are progressed, a delivery including oppositely rotating rollers, a vertically reciprocating blade for elevating the signatures between said rollers, a pivoted fly for delivering books after they pass said rollers, off-bearing delivery tapes to which the books are delivered by said fly, a cam shaft, a cam mounted thereon and controlling said blade, a second cam mounted thereon and controlling said fly, and driving connections between said shaft and said tapes.

40. In a device of the character described, the combination of a saddle along which signatures are progressed, a delivery including oppositely rotating rollers, a pivoted fly and off-bearing delivery tapes to which the books are delivered by the fly, means for varying the speed of movement of said fly and tapes, and means for varying the speed of rotation of said cam shaft.

In testimony whereof I have signed this specification.

EDWARD R. KAST.